US012812303B2

(12) United States Patent
Fu

(10) Patent No.: US 12,812,303 B2
(45) **Date of Patent: *Nov. 24, 2026**

(54) EARPHONES AND TRANSDUCER DEVICES THEREOF

(71) Applicant: SHENZHEN SHOKZ CO., LTD., Shenzhen (CN)

(72) Inventor: Junjiang Fu, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 82 days.

This patent is subject to a terminal disclaimer.

(21) Appl. No.: 18/650,063

(22) Filed: Apr. 29, 2024

(65) Prior Publication Data

US 2024/0284110 A1 Aug. 22, 2024

Related U.S. Application Data

(63) Continuation of application No. PCT/CN2022/119843, filed on Sep. 20, 2022.

(51) Int. Cl.
*H04R 9/02* (2006.01)
*H04R 1/10* (2026.01)
(Continued)

(52) U.S. Cl.
CPC ........... *H04R 9/025* (2013.01); *H04R 1/1075* (2013.01); *H04R 1/288* (2013.01); *H04R 1/2896* (2013.01); *H04R 9/045* (2013.01); *H04R 9/06* (2013.01)

(58) Field of Classification Search
CPC ...... H04R 9/025; H04R 1/1075; H04R 1/288; H04R 1/2896; H04R 9/045; H04R 9/06;
(Continued)

(56) References Cited

U.S. PATENT DOCUMENTS

2003/0034705 A1* 2/2003 Hakansson ............ H04R 9/066 310/81
2006/0045298 A1 3/2006 Westerkull
(Continued)

FOREIGN PATENT DOCUMENTS

CN 102014328 A 4/2011
CN 106303865 A 1/2017
(Continued)

OTHER PUBLICATIONS

The Extended European Search Report in European Application No. 22959018.7 mailed on Dec. 23, 2024, 10 pages.
(Continued)

*Primary Examiner* — Sunita Joshi
(74) *Attorney, Agent, or Firm* — METIS IP LLC

(57) ABSTRACT

The present disclosure relates to an earphone and a transducer device thereof. The transducer device may include a first magnet conductor, a coil, and a magnet assembly. An orthographic projection of the coil on a reference plane perpendicular to a first reference direction may surround an orthographic projection of at least a portion of the first magnet conductor on the reference plane. An orthographic projection of the magnet assembly on the reference plane may surround a periphery of the orthographic projection of the coil on the reference plane. One of the first magnet conductor and the magnet assembly may be connected to the coil. A magnetic field generated by the coil after an excitation signal is input may interact with a magnetic field generated by the magnet assembly to cause the first magnet conductor to move relative to the magnet assembly.

18 Claims, 8 Drawing Sheets

(51) Int. Cl.

| | |
|---|---|
| ***H04R 1/28*** | (2006.01) |
| ***H04R 9/04*** | (2006.01) |
| ***H04R 9/06*** | (2006.01) |

(58) Field of Classification Search
CPC . H04R 2400/07; H04R 9/066; H04R 2460/13
See application file for complete search history.

(56) References Cited

U.S. PATENT DOCUMENTS

| | | | | |
|---|---|---|---|---|
| 2008/0265692 | A1 | 10/2008 | Roberts | |
| 2014/0275731 | A1 | 9/2014 | Andersson et al. | |
| 2020/0412219 | A1 | 12/2020 | Zhou et al. | |
| 2021/0168483 | A1* | 6/2021 | Zhang .................. | H04R 1/1091 |
| 2021/0328491 | A1 | 10/2021 | Takahashi et al. | |
| 2024/0284109 | A1 | 8/2024 | Fu | |
| 2024/0284110 | A1 | 8/2024 | Fu | |

FOREIGN PATENT DOCUMENTS

| | | | |
|---|---|---|---|
| CN | 209330392 | U | 8/2019 |
| CN | 209787427 | U | 12/2019 |
| CN | 112752203 | A | 5/2021 |
| CN | 214708015 | U | 11/2021 |
| CN | 218830549 | U | 4/2023 |
| EP | 3782379 | B1 | 10/2024 |
| JP | 2004208220 | A | 7/2004 |
| WO | 2010114195 | A1 | 10/2010 |
| WO | 2020015472 | A1 | 1/2020 |
| WO | 2022051680 | A1 | 3/2022 |

OTHER PUBLICATIONS

International Search Report in PCT/CN2022/119843 mailed on Apr. 20, 2023, 6 pages.

Written Opinion in PCT/CN2022/119843 mailed on Apr. 20, 2023, 5 pages.

* cited by examiner

EARPHONES AND TRANSDUCER DEVICES THEREOF

CROSS-REFERENCE TO RELATED APPLICATION

This application is a Continuation of International Application No. PCT/CN2022/119843, filed on Sep. 20, 2022, the contents of which are incorporated herein by reference.

TECHNICAL FIELD

The present disclosure is related to a technical field of electronic devices, and in particular, to earphones and transducer devices thereof.

BACKGROUND

With the continuous popularization of electronic devices, the electronic devices have become an indispensable social and entertainment tool in people's daily lives, and people's requirements for electronic devices are getting higher and higher. Electronic devices such as earphones have been widely used in people's daily lives, and the earphones are used with cell phones, computers, and other terminal devices to provide users with a feast of hearing. According to a working principle of the earphones, the earphones may generally be categorized into air-conduction earphones and bone-conduction earphones. According to the way in which the user wears the earphones, the earphones may generally be divided into headsets, ear-hook earphones, and earbuds. According to the way in which the earphones interact with the electronic device, the earphones may generally also be divided into wired earphones and wireless earphones.

SUMMARY

Embodiments of the present disclosure provide a transducer device including a first magnet conductor, a coil, and a magnet assembly. An orthographic projection of the coil on a reference plane perpendicular to a first reference direction may surround a periphery of an orthographic projection of at least a portion of the first magnet conductor on the reference plane. An orthographic projection of the magnet assembly on the reference plane may surround a periphery of the orthographic projection of the coil on the reference plane. One of the first magnet conductor and the magnet assembly may be connected to the coil. A magnetic field generated by the coil after an excitation signal is input may interact with a magnetic field generated by the magnet assembly to cause the first magnet conductor to move relative to the magnet assembly.

Embodiments of the present disclosure provide an earphone including a support assembly and a core module connected to the support assembly. The support assembly may be configured to support the core module and place the core module at a wearing position. The core module may include a core housing and the transducer device described in the above embodiments. The core housing may be connected to the support assembly, and the transducer device may be disposed in an accommodation cavity of the core housing.

Beneficial effects of the present disclosure may include: in the transducer device provided in the present disclosure, the coil may be connected to one of the first magnet conductor and the magnet assembly, which may reduce the magnetic gap between the first magnet conductor and the magnet assembly, thereby improving the sensitivity of the transducer device.

BRIEF DESCRIPTION OF THE DRAWINGS

To more clearly illustrate the technical solutions in the embodiments of the present disclosure, the following will briefly introduce the accompanying drawings that need to be used in the description of the embodiments. It is obvious that the accompanying drawings in the following description are only some of the embodiments of the present disclosure, and other drawings may be obtained based on these drawings without creative labor to those skilled in the art.

Figure 12:
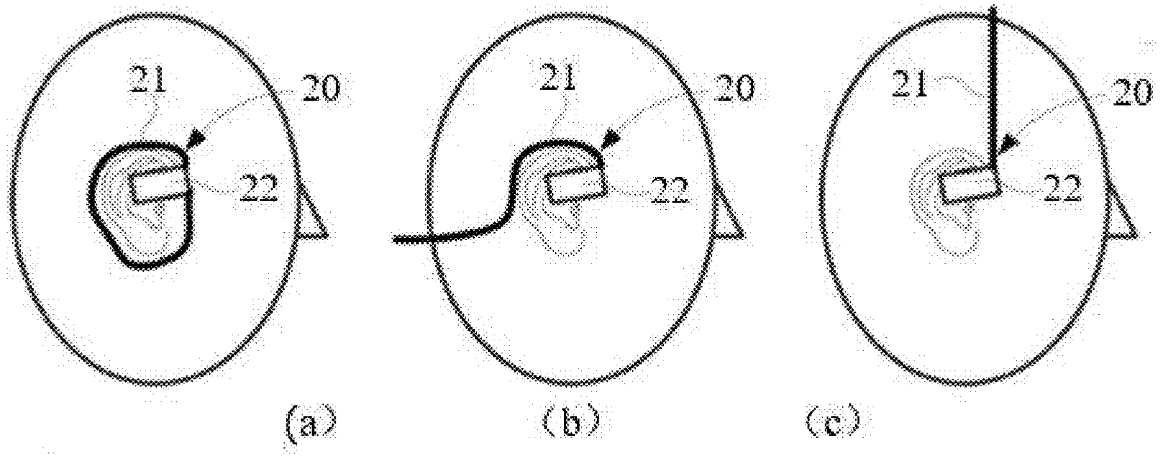
Figure 13:
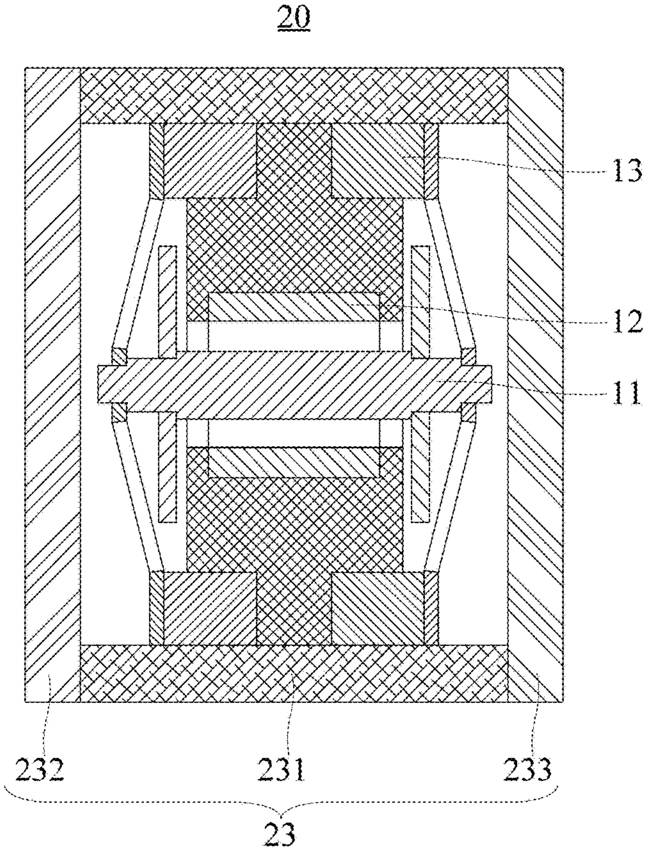
Figure 14:
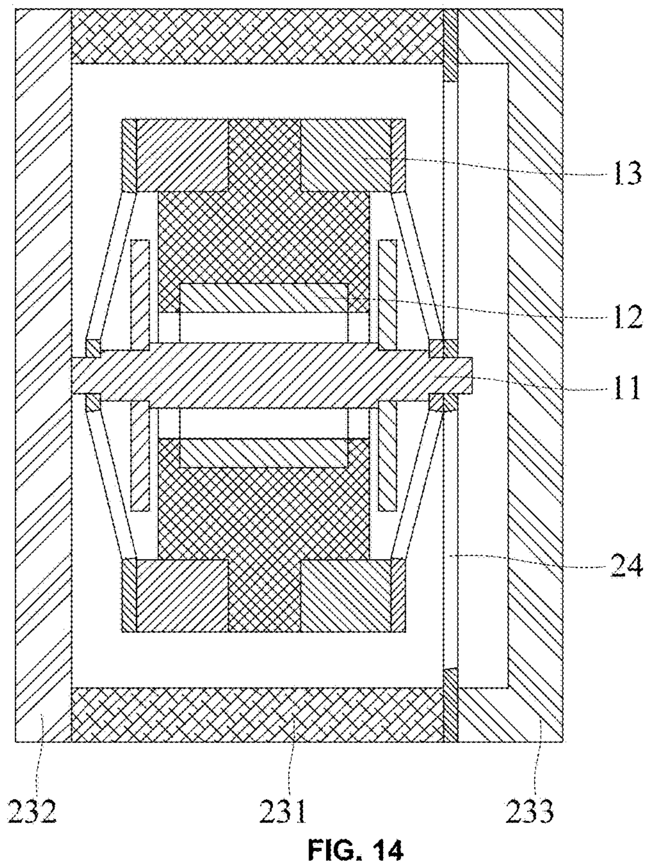
Figure 15:
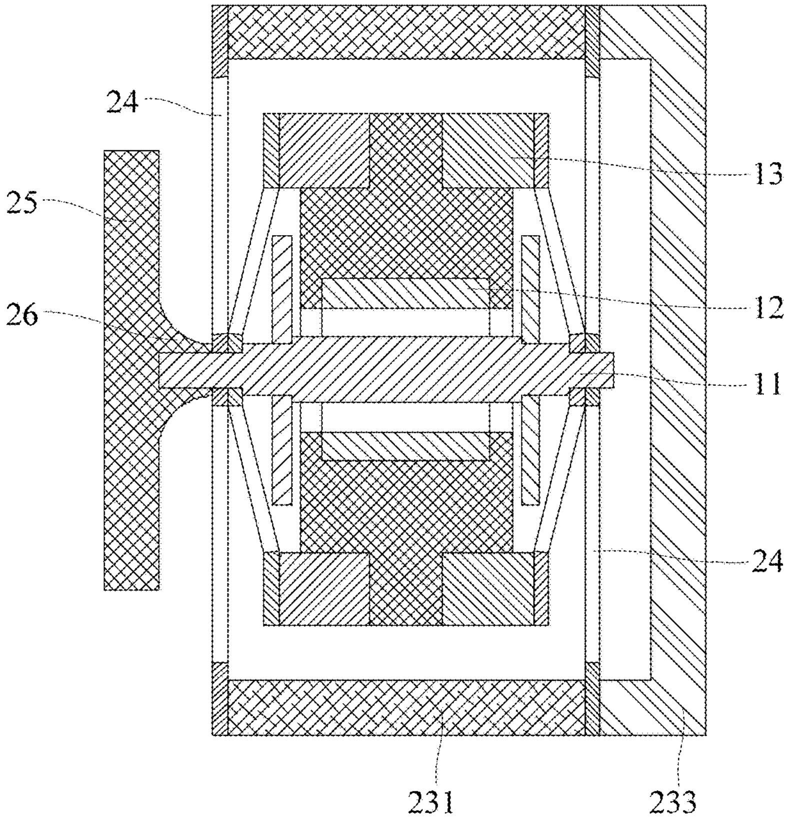
Figure 16:
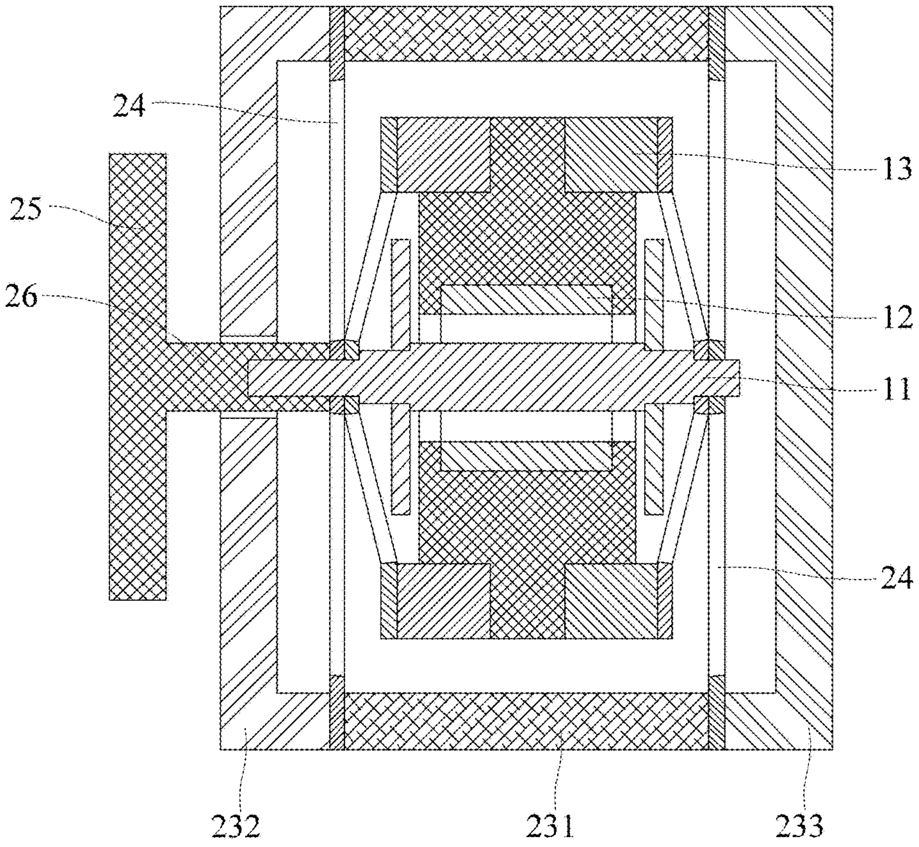

(a) to (c) in FIG. 12 are schematic diagrams illustrating earphones in a wearing state according to some embodiments of the present disclosure;

FIG. 13 is a schematic diagram illustrating a cross-sectional structure of an earphone according to an embodiment of the present disclosure;

FIG. 14 is a schematic diagram illustrating a cross-sectional structure of an earphone according to an embodiment of the present disclosure;

FIG. 15 is a schematic diagram illustrating a cross-sectional structure of an earphone according to an embodiment of the present disclosure; and FIG. 16 is a schematic diagram illustrating a cross-sectional structure of an earphone according to an embodiment of the present disclosure.

DETAILED DESCRIPTION

The present disclosure is described in further detail below in connection with the accompanying drawings and embodiments. In particular, it may be noted that the following embodiments are only used to illustrate the present disclosure, but do not limit the scope of the present disclosure. Similarly, the following embodiments are only a portion of the embodiments of the present disclosure rather than all of the embodiments, and all other embodiments obtained by those skilled in the art without creative labor may fall within the scope of the protection of the present disclosure.

References to "embodiments" in the present disclosure mean that particular features, structures, or characteristics described combining embodiments may be included in at least one embodiment of the present disclosure. It may be understood by those skilled in the art, both explicitly and implicitly, that the embodiments described in the present disclosure may be combined with other embodiments.

Figure 1:
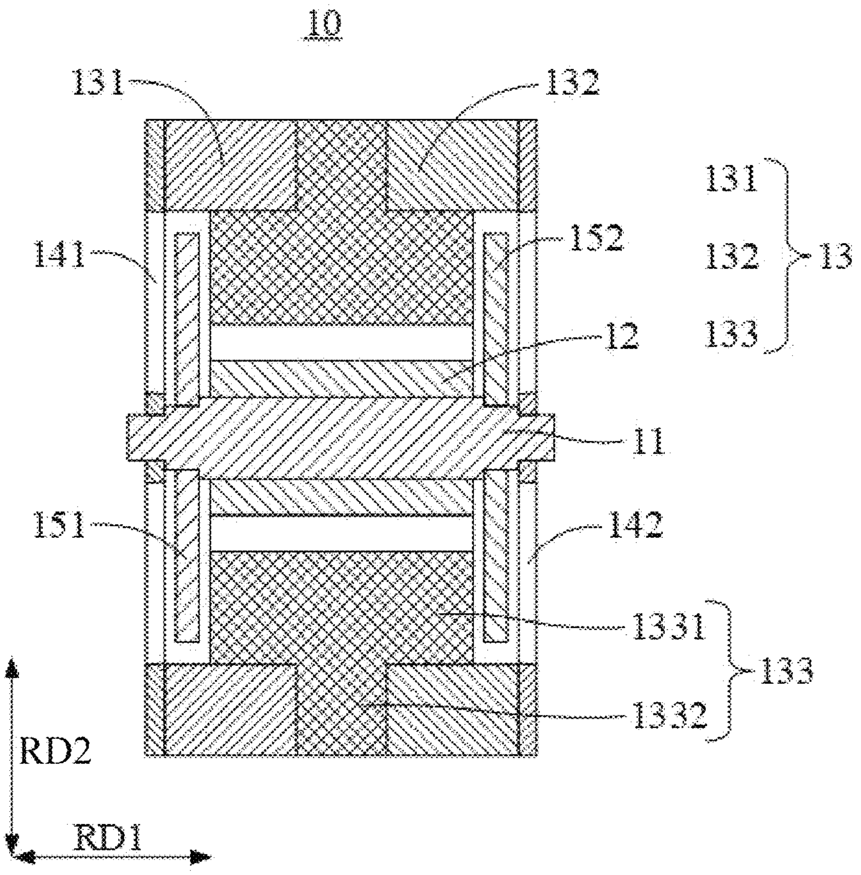
FIG. 1 is a schematic diagram illustrating a cross-sectional structure of a transducer device according to an embodiment of the present disclosure.
Figure 2:
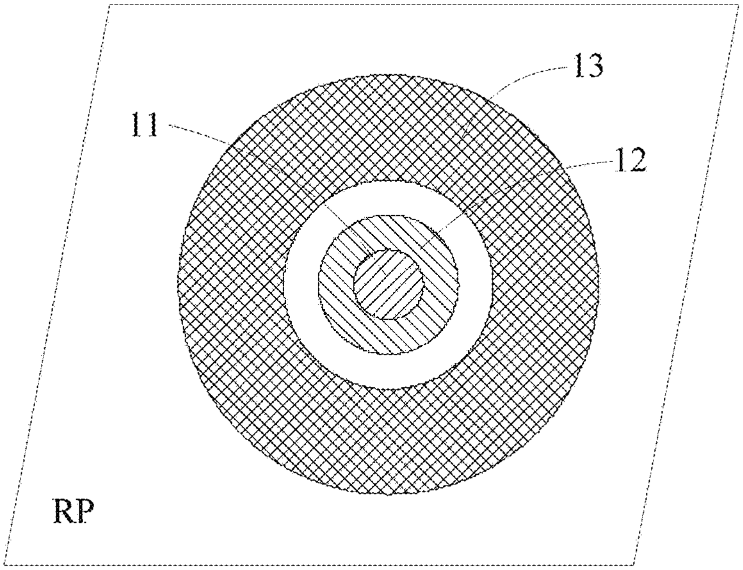
FIG. 2 is a schematic diagram illustrating a top view of a transducer device according to an embodiment of the present disclosure.

According to FIG. 1 and FIG. 2, a transducer device 10 may include a first magnet conductor 11, a coil 12, and a magnet assembly 13. An orthographic projection of the coil 12 on a reference plane (e.g., RP illustrated in FIG. 2) perpendicular to a first reference direction (e.g., RD1 illustrated in FIG. 1) may surround a periphery of at least a portion of an orthographic projection of the first magnet conductor 11 on the foregoing reference plane. An orthographic projection of the magnet assembly 13 on the reference plane may surround a periphery of the orthographic projection of the coil 12 on the reference plane. In other words, the first magnet conductor 11 may have a columnar structure when viewed along the first reference direction. The coil 12 and the magnet assembly 13 may each have an annular structure and disposed in a second reference direction (e.g., shown as RD2 in FIG. 1) perpendicular to the first reference direction. The coil 12 may be disposed within a magnetic gap between the first magnet conductor 11 and the magnet assembly 13. The first magnet conductor 11 may be disposed as a cylinder, and the coil 12 and the magnet assembly 13 may each be disposed as a ring. In such cases, the first reference direction may be an axial direction of the cylinder, and the second reference direction may be a radial direction of the cylinder.

Further, the magnet assembly 13 may be used to form a magnetic field. The first magnet conductor 11 and other structural members having a magnetic conductivity (e.g., the third magnet conductor 151 and the fourth magnet conductor 152 mentioned later) may be configured to adjust a distribution of the magnetic field formed by the magnet assembly 13 in a three-dimensional (3D) space. That is, the magnet assembly 13, the first magnet conductor 11, and other members having magnetic conductivity may form a magnetic circuit system of the transducer device 10. The coil 12 may be configured to generate another (varying) magnetic field after an excitation signal is input. Based on this, at least one of the first magnet conductor 11 and the magnet assembly 13 may be connected to the coil 12. The magnetic field generated by the coil 12 after the excitation signal is input may interact with the magnetic field generated by the magnet assembly 13 to cause the first magnet conductor 11 to move relative to the magnet assembly 13 such that the transducer device 10 may transform the excitation signal into a mechanical vibration. One of the first magnet conductor 11 and the magnet assembly 13 may be configured as an output end of the transducer device 10, which may be connected to other members (e.g., the core housing 23 or the vibration panel 25 mentioned later) to output the mechanical vibration generated by the transducer device 10. In such cases, compared to the related techniques in which the coil 12 extends into the magnetic gap of a magnetic circuit system formed by a magnet and a magnetic conductive cover thereby resulting in a a relatively large magnetic gap, the coil 12 in the present disclosure is connected to at least one of the first magnet conductor 11 and the magnet assembly 13, which may reduce the magnetic gap between the first magnet conductor 11 and the magnet assembly 13, thereby improving the sensitivity of the transducer device 10.

It should be noted that all directional indications (such as up, down, left, right, forward, back . . . ) in the embodiments of the present disclosure are only used to explain a positional relationship among the components, movements of the components, etc. in a specific state (as illustrated in FIGS. 1 and 2). If the specific state changes, the directional indication may change accordingly. Based on this, unless the context clearly indicates otherwise, the first reference direction and the second reference direction mentioned later correspond to RD1 and RD2 illustrated in FIG. 1, respectively.

In some embodiments, one of the first magnet conductor 11 and the magnet assembly 13 may be connected to the coil 12 through a rigid connection. The other one of the first magnet conductor 11 and the magnet assembly 13 may be spaced apart from the coil 12 in the second reference direction. The rigid connection refers to that: the coil 12 may be wound around the first magnet conductor 11, and the coil 12 and the first magnet conductor 11 may be further fixed by a hard glue such as an epoxy glue and a structural glue. Alternatively, the coil 12 may be fixed to an inner side of the magnet assembly 13 facing the first magnet conductor 11 through hard glue such as epoxy glue and structural glue. Further, after the excitation signal is input to the coil 12, the rigid connection refers to that: in a frequency range such as 20 Hz to 2 kHz, or a target frequency range such as 20 Hz to 20 kHz, one of the first magnet conductor 11 and the magnet assembly 13 connected to the coil 12 through the rigid connection may keep following the coil 12, and a relative movement between the one of the first magnet conductor 11 and the magnet assembly 13 and the coil 12 may be negligible. The case that a member keeps following another member described in the present disclosure may be defined as that: for frequency response curves of vibration of the two members, wherein horizontal and vertical coordinates of each frequency response curve are frequency (in Hz) and amplitude (in dB), respectively, a difference between the maximum amplitudes of the vibrations of the two members is less than or equal to 3 dB, and a difference between phases of the vibrations of the two members is less than or equal to 90°.

For example, according to FIG. 1, the coil 12 may be wound around the first magnet conductor 11. The coil 12 may be further fixed with the first magnet conductor 11 through hard glue such as epoxy glue, structural glue, etc. That is, the coil 12 may be connected to the first magnet conductor 11 through the rigid connection. The coil 12 and the magnet assembly 13 may be spaced apart in the second reference direction. At this time, the first magnet conductor 11 may serve as an output end of the transducer device 10. In such cases, a total mass of the output end of the transducer device 10 may increase as the first magnet conductor 11 drives the coil 12 to vibrate together. In such cases, to a certain extent, although a resonance peak of the output end of the transducer device 10 may deviate toward a low-frequency range, the sensitivity of the transducer device 10 may be affected. In addition, as the coil 12 vibrates along with the first magnet conductor 11, the coil 12 may have a relatively great displacement, which increases the risk of an outgoing wire of coil 12 being ripped off. The outgoing wire of the coil 12 refers to a portion of the wire of the coil 12 that extends toward an outside of the transducer device 10 and is configured to receive the excitation signal.

Figure 3:
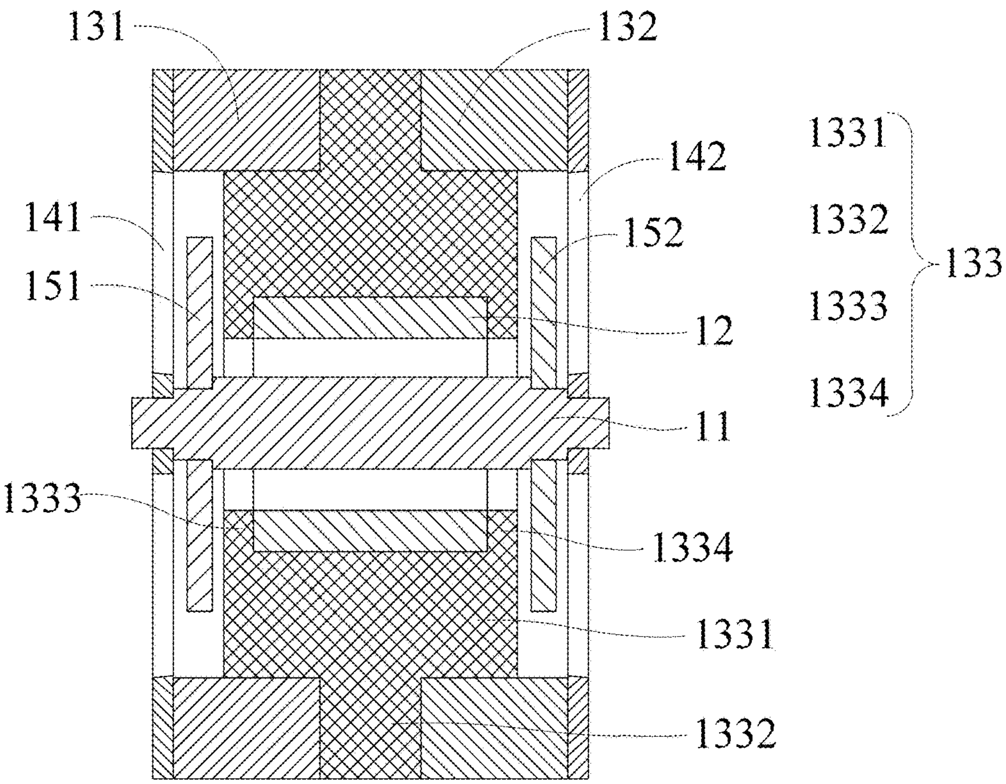
FIG. 3 is a schematic diagram illustrating a cross-sectional structure of a transducer device according to an embodiment of the present disclosure.

For example, according to FIG. 3, the coil 12 may be fixed to an inner side of the magnet assembly 13 facing the first magnet conductor 11 through hard glue such as epoxy glue and structural glue. That is, the coil 12 may be connected to the magnet assembly 13 through the rigid connection. The coil 12 and the first magnet conductor 11 may be spaced apart in the second reference direction. At this time, the first magnet conductor 11 may serve as the output end of the transducer device 10. In such cases, as the first magnet conductor 11 does not need to drive the coil 12 and vibrate with the coil 12, the total mass of the output end of the transducer device 10 may be reduced, which is conducive to improving the sensitivity of the transducer device 10. In addition, as the coil 12 does not follow the first magnet conductor 11 to vibrate, the displacement of the coil 12 may be reduced, which is conducive to reducing the risk of the outgoing wire of the coil 12 being ripped off, thereby improving the reliability of the coil 12.

It should be noted that when one of the first magnet conductor 11 and the magnet assembly 13 is connected to the coil 12 through the rigid connection, the other one of the first magnet conductor 11 and the magnet assembly 13 may serve as the output end of the transducer device 10. In such cases, the total mass of the output end of the transducer device 10 may be reduced under the same conditions, which may increase the sensitivity of the transducer device 10. Furthermore, when one of the first magnet conductor 11 and the magnet assembly 13 serves as the output end of the transducer device 10, compared with the case in which the coil 12 is connected to the output end of the transducer device 10 through the rigid connection, the coil 12 may be connected to the other one of the first magnet conductor 11 and the magnet assembly 13 through the rigid connection such that the displacement of the coil 12 may be reduced, which is conducive to reducing the risk of the outlet end of the coil 12 being ripped off, thereby improving the reliability of the coil 12. In addition, when one of the first magnet conductor 11 and the magnet assembly 13 is connected to the coil 12 through the rigid connection, the one of the first magnet conductor 11 and the magnet assembly 13 may serve as a short-circuit ring of the coil 12, which may reduce inductance of the coil 12.

Further, the magnet assembly 13 may include a first magnet 131 and a second magnet 132 stacked along the first reference direction. The first magnet 131 and the second magnet 132 may be configured to provide a stable magnetic field for the magnet assembly 13. A direction of the magnetic field of the first magnet 131 may be different from a direction of the magnetic field of the second magnet 132 such that the magnetic field formed by the magnet assembly 13 may be more concentrated towards a half-thickness of the magnet assembly 13 in the first reference direction, thereby increasing utilization of the magnetic field formed by the magnet assembly 13. Furthermore, an orthographic projection of the coil 12 on an inner circumferential surface of the magnet assembly 13 along the second reference direction may overlap with a junction between the first magnet 131 and the second magnet 132 such that more magnetic induction lines of the magnetic field formed by the magnet assembly 13 may pass through the coil 12, thereby increasing the utilization of the magnetic field formed by the magnet assembly 13. For example, the direction of the magnetic field of the first magnet 131 and the direction of the magnetic field of the second magnet 132 may be opposite to each other and may be parallel to the first reference direction. A thickness of the first magnet 131 in the first reference direction and a thickness of the second magnet 132 in the first reference direction may be equal. For example, the first magnet 131 and the second magnet 132 may be mirrored relative to a symmetry plane perpendicular to the first reference direction. In such cases, a half-height of the coil 12 in the first reference direction may be flush with the junction between the first magnet 131 and the second magnet 132.

Further, the magnet assembly 13 may include a second magnet conductor 133. The second magnet conductor 133 may be disposed in a ring and at least a portion of the second magnet conductor 133 may be disposed on an inner side of the first magnet 131 and the second magnet 132 facing the first magnet conductor 11. The second magnet conductor 133 may be configured to adjust the magnetic induction lines of the magnetic fields provided by the first magnet 131 and the second magnet 132 so that the magnetic induction lines are as close as possible to the second reference direction. For example, the magnetic induction lines may travel from or back to the magnet assembly 13 in a manner perpendicular to an inner annular surface of the second magnet conductor 133 facing the first magnet conductor 11. At this point, the coil 12 may be fixed to the inner side of the second magnet conductor 133 facing the first magnet conductor 11. In such cases, the magnetic induction lines may be allowed to pass through the coil 12 along the radial direction of the coil 12, thereby causing the transducer device 10 to generate a sufficiently strong mechanical vibration.

For example, the second magnet conductor 133 may include a cylindrical portion 1331 and an annular portion 1332 connected to an outer periphery of the cylindrical portion 1331. In the first reference direction, a thickness of the cylindrical portion 1331 may be greater than a thickness of the annular portion 1332. The annular portion 1332 may be sandwiched between the first magnet 131 and the second magnet 132. At this point, the coil 12 may be fixed to an inner side of the cylindrical portion 1331 facing the first magnet conductor 11. Further, a height of the coil 12 in the first reference direction may be less than or equal to the thickness of the cylindrical portion 1331. The thickness of the cylindrical portion 1331 in the first reference direction may be less than or equal to a sum of the thicknesses of the first magnet 131, the second magnet 132, and the annular portion 1332. In such cases, the magnet assembly 13 may be able to provide a magnetic field of sufficient field strength for the coil 12.

Furthermore, the second magnet conductor 133 may include a first limiting portion 1333 and a second limiting portion 1334 that are connected to the cylindrical portion 1331. In the first reference direction, the first limiting portion 1333 and the second limiting portion 1334 may be disposed on two sides of the coil 12 to limit the coil 12. In such cases, the coil 12 may be prevented from moving relative to the second magnet conductor 133, which allows the magnet assembly 13 to keep following the coil 12. At least one of the first limiting portion 1333 and the second limiting portion 1334 may be a member independent of the cylindrical portion 1331 to facilitate a mounting of the coil 12. For example, the coil 12 may be first fixed to the inner side of the cylindrical portion 1331 facing the first magnet conductor 11 through hard glue such as epoxy glue and structural glue. Further, one of the first limiting portion 1333 and the second limiting portion 1334 that is independent from the cylindrical portion 1331 may be fixed to the cylindrical portion 1331 though one or a combination of assembling manners such as gluing, clamping, threading, etc.

Further, the transducer device 10 may include a first vibration transmission plate 141 and a second vibration transmission plate 142. In the first reference direction, the first vibration transmission plate 141 and the second vibration transmission plate 142 may be disposed on two sides of the coil 12. The first vibration transmission plate 141 may connect one end of the first magnet conductor 11 and one end of the magnet assembly 13. The second vibration transmission plate 142 may connect the other end of the first magnet conductor 11 and the other end of the magnet assembly 13. For example, the first vibration transmission plate 141 may connect one end of the first magnet conductor 11 and an outer side of the first magnet 131 away from the second magnet 132. The second vibration transmission plate 142 may connect the other end of the first magnet conductor 11 and an outer side of the second magnet 132 away from the first magnet 131. In such cases, compared to the case in which the first magnet conductor 11 is connected to the magnet assembly 13 through only one vibration transmission plate, the case in which the first magnet conductor 11 is connected to the magnet assembly 13 through two vibration transmission plates spaced apart from each other may be more conducive to preventing the first magnet conductor 11 and the magnet assembly 13 from attracting each other due to a magnetic force, thereby effectively maintaining the magnetic gap between the first magnet conductor 11 and the magnet assembly 13.

Figure 4:
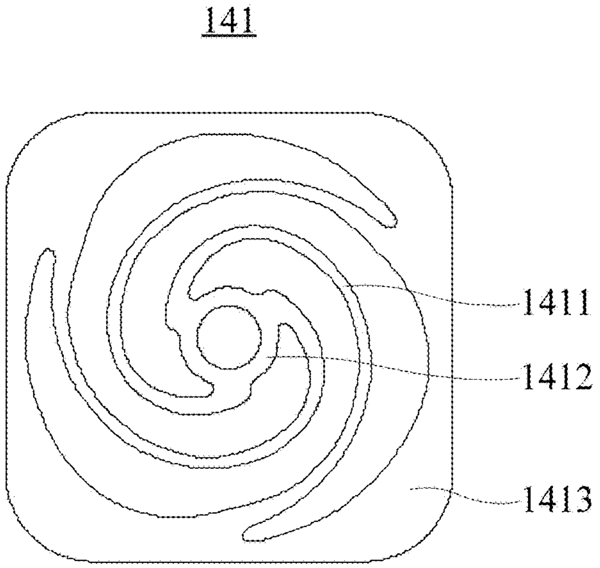
FIG. 4 is a schematic diagram illustrating a top view of a first vibration transmission plate according to an embodiment of the present disclosure.
Figure 5:
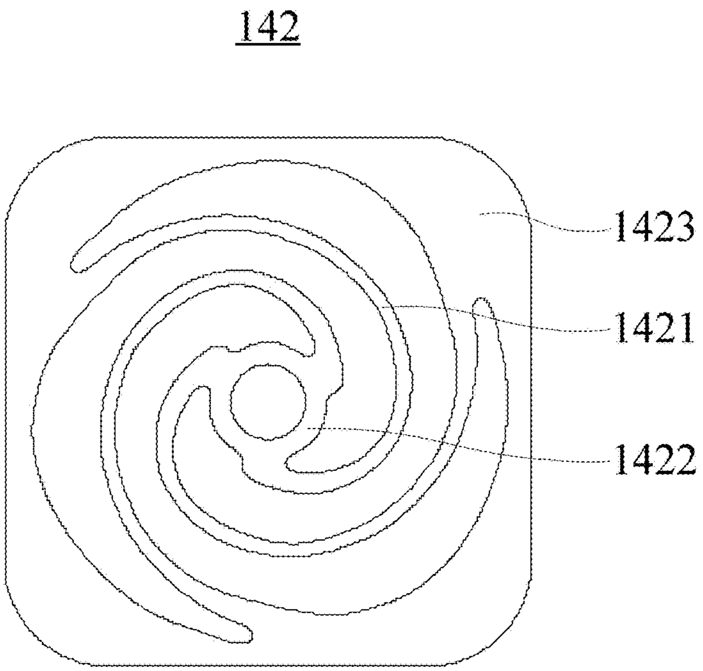
FIG. 5 is a schematic diagram illustrating a top view of a second vibration transmission plate according to an embodiment of the present disclosure.

In some embodiments, according to FIG. 4 and FIG. 5, the first vibration transmission plate 141 may include a first radial portion 1411, and a first inner fixing portion 1412 and a first outer fixing portion 1413 that are connected to the first radial portion 1411. In such cases, the first vibration transmission plate 141 may be connected to the first magnet conductor 11 and the magnet assembly 13 through the first inner fixing portion 1412 and the first outer fixing portion 1413, respectively. The second vibration transmission plate 142 may include a second radial portion 1421, and a second inner fixing portion 1422 and a second outer fixing portion 1423 that are connected to the second radial portion 1421. In such cases, the second vibration transmission plate 142 may be connected to the first magnet conductor 11 and the magnet assembly 13 through the second inner fixing portion 1422 and the second outer fixing portion 1423, respectively. The first radial portion 1411 may include a plurality of first spokes spirally extending outward from a center of the first vibration transmission plate 141. For example, the three first spokes shown in FIG. 4. In such cases, a region between the first inner fixing portion 1412 and the first outer fixing portion 1413 may have a hollow structure, so that the first vibration transmission plate 141 has a preset rigidity (i.e., an elasticity coefficient). The second radial portion 1421 may include a plurality of second spokes spirally extending outward from the center of the second vibration transmission plate 142, for example, three second spokes illustrated in FIG. 5. In such cases, a region between the second inner fixing portion 1422 and the second outer fixing portion 1423 may have the hollow structure, so that the second vibration transmission plate 142 may have a preset rigidity (i.e., an elasticity coefficient). Furthermore, when viewed along the first reference direction, a first spoke and a second spoke corresponding to each other may have opposite spiral directions, wherein a position of the first spoke at the first vibration transmission plate 141 is the same as a position of the second spoke at the second vibration transmission plate 142. For example, the spiral direction of the first spoke in FIG. 4 may be clockwise, and the spiral direction of the second spoke in FIG. 5 may be counterclockwise. In such cases, during the vibration of the transducer device 10, when the first magnet conductor 11 and the magnet assembly 13 have a twisting tendency around the first reference direction, one of the first vibration transmission plate 141 and the second vibration transmission plate 142 may hinder such twisting tendency, thereby avoiding unnecessary collision, which is conducive to further reducing the magnetic gap between the first magnet conductor 11 and the magnet assembly 13.

Figure 6:
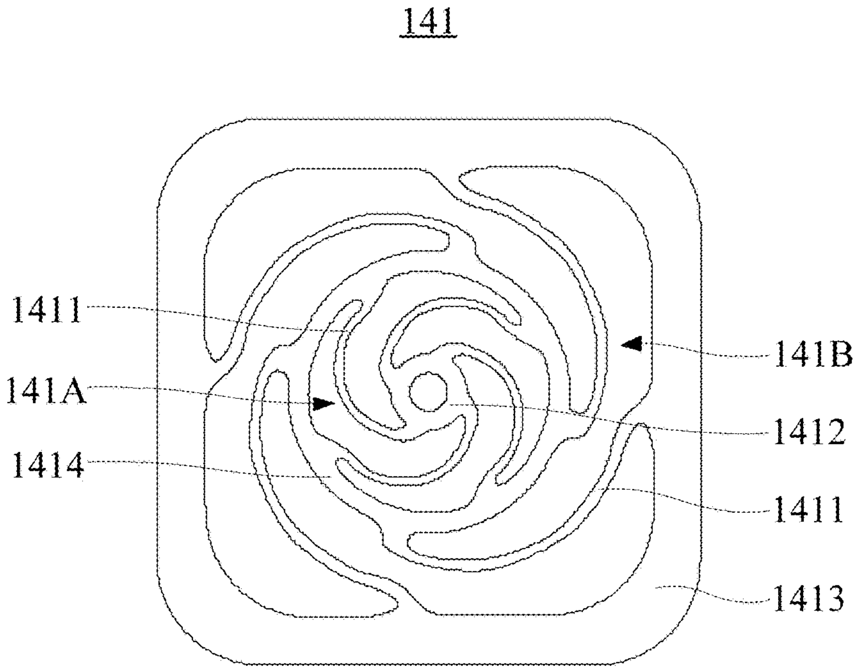
FIG. 6 is a schematic diagram illustrating a top view of a first vibration transmission plate according to an embodiment of the present disclosure.

In some embodiments, according to FIG. 6, the first vibration transmission plate 141 may include the first radial portion 1411, and the first inner fixing portion 1412 and the first outer fixing portion 1413 that are connected to the first spoke portion 1411. In such cases, the first vibration transmission plate 141 may be connected to the first magnet conductor 11 and the magnet assembly 13 through the first inner fixing portion 1412 and the first outer fixing portion 1413, respectively. The first radial portion 1411 may include a first sub-region 141A and a second sub-region 141B nested within each other along a radial direction (i.e., the second reference direction) of the first vibration transmission plate 141. The spiral directions of the first spokes within the first sub-region 141A and the second sub-region 141B may be opposite. For example, as illustrated in FIG. 6, the spiral direction of the first spokes within the first sub-region 141A on the inner side may be clockwise, while the spiral direction of the first spokes within the second sub-region 141B on the outer side may be counterclockwise. In such cases, during the vibration of the transducer device 10, when the first magnet conductor 11 and the magnet assembly 13 have a twisting tendency around the first reference direction, the first vibration transmission plate 141, having the first spokes on the inner side and the first spokes on the outer side that have opposite spiral directions, may hinder the tendency, which may avoid unnecessary collisions, thereby further reducing the magnetic gap between the first magnet conductor 11 and the magnet assembly 13. The first vibration transmission plate 141 may further include a first transition portion 1414. The first spokes within the first sub-region 141A and the first spokes within the second sub-region 141B may be connected through the first transition portion 1414. Furthermore, in a circumferential direction of the first vibration transmission plate 141, a connection point between any one of the first spokes within the first sub-region 141A and the first transition portion 1414 may be located between two connection points, wherein the two connection points include a connection point between a first spoke within the second sub-region 141B and the first transition portion 1414, and a connection point between an adjacent first spoke within the second sub-region 141B and the first transition portion 1414. In such cases, all the connection points are spaced apart from each other in the circumferential direction of the first vibration transmission plate 141, which facilitates a more uniform and stable deformation of the first vibration transmission plate 141.

Figure 7:
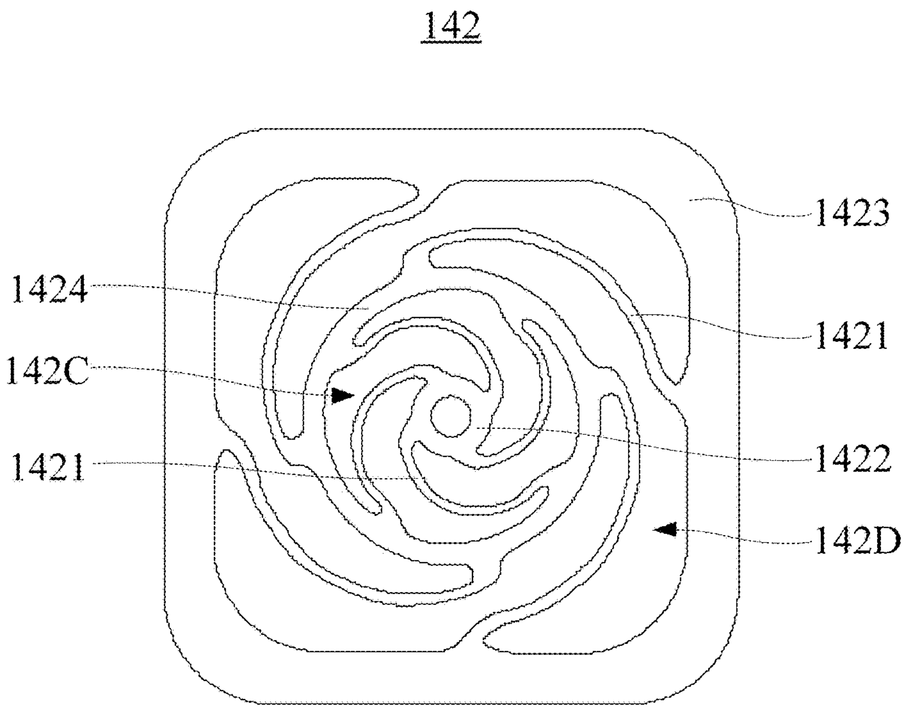
FIG. 7 is a schematic diagram illustrating a top view of a second vibration transmission plate according to an embodiment of the present disclosure.

Similarly, according to FIG. 7, the second vibration transmission plate 142 may include the second radial portion 1421, and the second inner fixing portion 1422 and the second outer fixing portion 1423 that are connected to the second radial portion 1421 such that the second vibration transmission plate 142 may be connected to the first magnet conductor 11 and the magnet assembly 13 through the second inner fixing portion 1422 and the second outer fixing portion 1423, respectively. The second radial portion 1421 may include a third sub-region 142C and a fourth sub-region 142D nested within each other along a radial direction (i.e., the second reference direction) of the second vibration transmission plate 142. The spiral directions of the second spokes within the third sub-region 142C and the fourth sub-region 142D may be opposite. For example, as illustrated in FIG. 7, the spiral direction of the second spokes within the third sub-region 142C located on the inner side may be counterclockwise, and the spiral direction of the second spokes within the fourth sub-region 142D located on the outer side may be clockwise. In such cases, during the vibration of the transducer device 10, when the first magnet conductor 11 and the magnet assembly 13 have twisting tendency around the first reference direction, the second vibration transmission plate 142, having the second spokes on the inner side and the second spokes on the outer side that have opposite spiral directions, may hinder such twisting tendency, which may avoid unnecessary collisions, thereby further reducing the magnetic gap between the first magnet conductor 11 and the magnet assembly 13. The second vibration transmission plate 142 may further include a second transition portion 1424. The second spokes within the third sub-region 142C and the second spokes within the fourth sub-region 142D may be connected through the second transition portion 1424. Further, in the circumferential direction of the second vibration transmission plate 142, a connection point between any one of the second spokes within the third subregion 142C and the second transition portion 1424 may be located between the two connection points, wherein the two connection points include a connection point between a second spoke within the fourth sub-region 142D and the second transition portion 1424, and a connection point between an adjacent second spoke within the fourth sub-region 142D and the second transition portion 1424. In such cases, all of the connection points are spaced apart from each other in the circumferential direction of the second vibration transmission plate 142, thereby facilitating a more uniform and stable deformation of the second vibration transmission plate 142.

It should be noted that for the first vibration transmission plate 141, the regions where the first inner fixing portion 1412 and the first outer fixing portion 1413 of the first vibration transmission plate 141 are located may be simply regarded as a center region and an edge region of the first vibration transmission plate 141, respectively. For the second vibration transmission plate 142, the regions where the second inner fixing portion 1422 and the second outer fixing portion 1423 of the second vibration transmission plate 142 are located may be simply regarded as the center region and the edge region of the second vibration transmission plate 142, respectively. Furthermore, when viewed along the first reference direction, an outer contour of the first vibration transmission plate 141 or the second vibration transmission plate 142 may be in one of the shapes of a rounded rectangle, a circle, etc.

Figure 8:
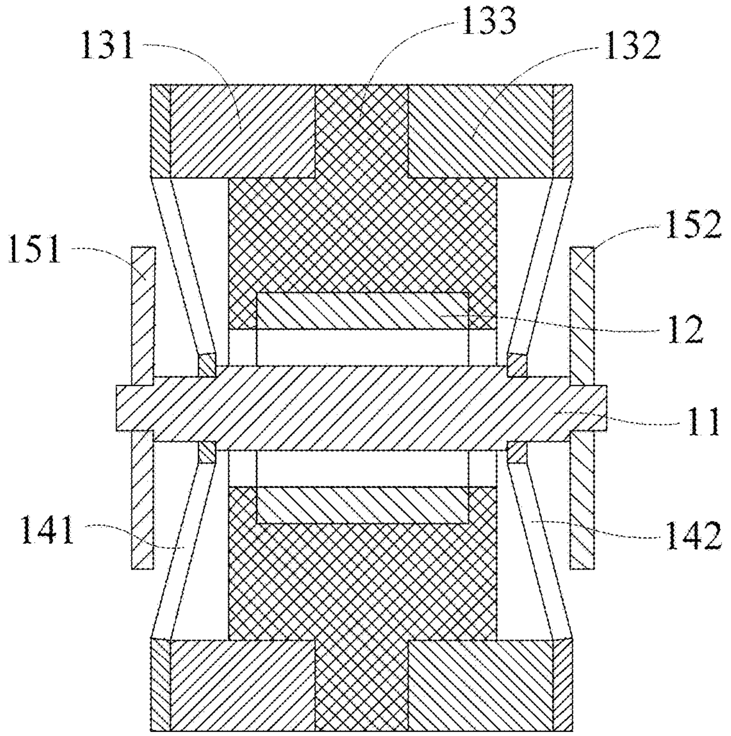
FIG. 8 is a schematic diagram illustrating a cross-sectional structure of a transducer device according to an embodiment of the present disclosure.
Figure 9:
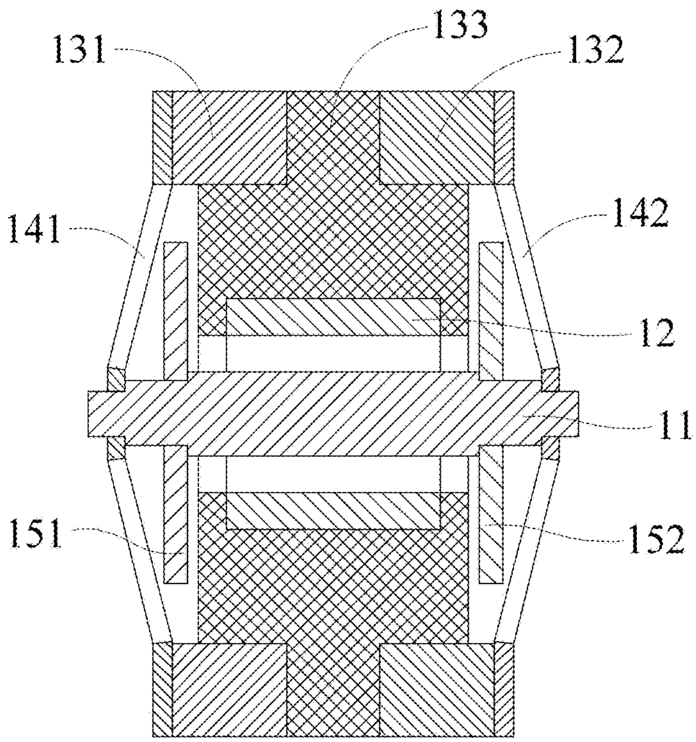
FIG. 9 is a schematic diagram illustrating a cross-sectional structure of a transducer device according to an embodiment of the present disclosure.

Furthermore, according to FIG. 8 and FIG. 9, when the transducer device 10 is in a non-working state with no excitation signal input to the coil 12, the edge region of the first vibration transmission plate 141 may be not coplanar with the center region of the first vibration transmission plate 141. That is, the first outer fixing portion 1413 and the first inner fixing portion 1412 may not be coplanar. The edge region of the second vibration transmission plate 142 may be not coplanar with the center region of the second vibration transmission plate 142. That is, the second outer fixing portion 1423 and the second inner fixing portion 1422 may not be coplanar. In such cases, the first vibration transmission plate 141 and the second vibration transmission plate 142 may have a pre-tightening force after they are connected to the first magnet conductor 11 and the magnet assembly 13. At this time, due to the existence of the pre-tightening force, the first vibration transmission plate 141 and the second vibration transmission plate 142 may not simultaneously have zero elasticity during the vibration of the transducer device 10, which may improve the stability and linearity of the transducer device 10. In addition, the first vibration transmission plate 141 and the second vibration transmission plate 142 may be in a planar shape before being assembled to the transducer device 10 as compared to after assembly, which may facilitate processing.

For example, in the non-working state, a first distance between the edge region of the first vibration transmission plate 141 and the center region of the first vibration transmission plate 141 in the first reference direction may be greater than or equal to 0.4 mm. A second distance between the edge region of the second vibration transmission plate 142 and the center region of the second vibration transmission plate 142 in the first reference direction may be greater than or equal to 0.4 mm. If the first distance and the second distance are too small, the pre-tightening forces provided by the first vibration transmission plate 141 and the second vibration transmission plate 142 may be too small to meet actual use requirements. Further, the first distance and second distance may be the same.

In some embodiments, according to FIG. 8, in the first reference direction, the center region of the first vibration transmission plate 141 may be closer to the magnet assembly 13 than the edge region of the first vibration transmission plate 141. The center region of the second vibration transmission plate 142 may be closer to the magnet assembly 13 than the edge region of the second vibration transmission plate 142. For example, a length of the first magnet conductor 11 in the first reference direction may be less than or equal to a thickness of the magnet assembly 13 in the first reference direction. The edge regions of the first vibration transmission plate 141 and the second vibration transmission plate 142 may be connected to the two ends of the magnet assembly 13, respectively. The center regions of the first vibration transmission plate 141 and the second vibration transmission plate 142 may be pressed at the two ends of the first magnet conductor 11 by fasteners such as nuts, retaining rings, etc., respectively.

In some embodiments, according to FIG. 9, in the first reference direction, the center region of the first vibration transmission plate 141 may be farther away from the magnet assembly 13 as than the edge region of the first vibration transmission plate 141. The center region of the second vibration transmission plate 142 may be farther away from the magnet assembly 13 than the edge region of the second vibration transmission plate 142. For example, a length of the first conductor 11 in the first reference direction may be greater than a thickness of the magnet assembly 13 in the first reference direction. The edge regions of the first vibration transmission plate 141 and the second vibration transmission plate 142 may be connected to the ends of the magnet assembly 13, respectively. The center regions of the first vibration transmission plate 141 and the second vibration transmission plate 142 may be connected to two ends of the first magnet conductor 11, respectively. In such cases, the first magnet conductor 11 may spread the first vibration transmission plate 141 and the second vibration transmission plate 142 along the first reference direction. It should be noted that the assembly manner of the first vibration transmission plate 141 and the second vibration transmission plate 142 illustrated in FIG. 9 is simpler than the assembly manner of the first vibration transmission plate 141 and the second vibration transmission plate 142 illustrated in FIG. 8.

Further, the transducer device 10 may include a third magnet conductor 151 and a fourth magnet conductor 152 connected to two ends of the first magnet conductor 11, respectively. The third magnet conductor 151 and the fourth magnet conductor 152 may be disposed on two sides of the coil 12 in the first reference direction, and may cover the magnetic gap between the first magnet conductor 11 and the magnet assembly 13 in the first reference direction. In such cases, more of the magnetic field formed by the magnet assembly 13 may be concentrated within the magnetic gap between the first magnet conductor 11 and the magnet assembly 13 such that more magnetic inductive lines of the magnetic field formed by the magnet assembly 13 may pass through the coil 12, thereby increasing the utilization of the magnetic field formed by the magnet assembly 13. The third magnet conductor 151 and the fourth magnet conductor 152 may be disposed in plates. Further, projections of the third magnet conductor 151 and the fourth magnet conductor 152 along the first reference direction may overlap with the projection of the second magnet conductor 133 (e.g., the cylindrical portion 1331) along the first reference direction.

In some embodiments, according to FIG. 8, the third magnet conductor 151 may be disposed on an outer side of the first vibration transmission plate 141 away from the second vibration transmission plate 142, and the fourth magnet conductor 152 may be disposed on an outer side of the second vibration transmission plate 142 away from the first vibration transmission plate 141. For example, the first magnet conductor 11 may be disposed as a five-segment structure with varying radial sizes. The coil 12 may surround a first segment of the first magnet conductor 11 that has the greatest radial size. The first vibration transmission plate 141 and the second vibration transmission plate 142 may be fixed to a second segment and a third segment of the first magnet conductor 11 that have the next greatest radial sizes, respectively. The third magnet conductor 151 and the fourth magnet conductor 152 may be fixed to a fourth segment and a fifth segment of the first magnet conductor 11 that have the smallest radial sizes, respectively. In such cases, the first vibration transmission plate 141 and the second vibration transmission plate 142 may be prevented from colliding with the corresponding third magnet conductor 151 and the fourth magnet conductor 152, respectively, and the first magnet conductor 11 may be prevented from colliding with the third magnet conductor 151 and the fourth magnet conductor 152.

In some embodiments, according to FIG. 9, the third magnet conductor 151 may be disposed on an inner side of the first vibration transmission plate 141 facing the second vibration transmission plate 142. The fourth magnet conductor 152 may be disposed on the inner side of the second vibration transmission plate 142 facing the first vibration transmission plate 141. For example, the first magnet conductor 11 may be disposed as a five-segment structure with varying radial sizes, and the coil 12 may surround a first segment of the first magnet conductor 11 that has the greatest radial size. The third magnet conductor 151 and the fourth magnet conductor 152 may be fixed to a second segment and a third segment of the first magnet conductor 11 that have the next greatest radial sizes, respectively. The first vibration transmission plate 141 and the second vibration transmission plate 142 may be fixed to a fourth segment and a fifth segment of the first magnet conductor 11 that have the smallest radial sizes. In such cases, the first vibration transmission plate 141 and the second vibration transmission plate 142 may be prevented from colliding with the corresponding third magnet conductor 151 and the fourth magnet conductor 152, respectively. It should be noted that compared to FIG. 8, the embodiment illustrated in FIG. 9 may facilitate reducing the gap between the third magnet conductor 151 and the second magnet conductor 133 in the first direction, and the gap between the fourth magnet conductor 152 and the second magnet conductor 133 in the first direction, thereby increasing the sensitivity of the transducer device 10.

In some embodiments, the coil 12 may be elastically connected to at least one of the first magnet conductor 11 and the magnet assembly 13 through an elastic member 16. The coil 12 may be spaced apart from at least one of the first magnet conductor 11 and the magnet assembly 13 in the second reference direction. The elastic member 16 may be a dried glue such as silicone or hot melt glue. In addition, at least one of the first vibration transmission plate 141 and the second vibration transmission plate 142 may be configured as the elastic member 16. For example, the coil 12 may be fixed to the first transition portion 1414 of the first vibration transmission plate 141 or the second transition portion 1424 of the second vibration transmission plate 142, which may be equivalent to that the coil 12 is elastically connected to at least one of the first magnet conductor 11 and the magnet assembly 13 through the elastic member 16. The coil 12 may be spaced apart from at least one of the first magnet conductor 11 and the magnet assembly 13 in the second reference direction. Further, after the excitation signal is input to the coil 12, the elastic connection refers to that, in a first target frequency range of 20 Hz to 200 Hz, or a first frequency range of 20 Hz to 2 kHz, the coil 12 moves with one of the first magnet conductor 11 and the magnet assembly 13 through the elastic member 16. In a second target frequency range of 2 kHz to 20 kHz, one of the first magnet conductor 11 and the magnet assembly 13 that is elastically connected to the coil 12 through the elastic member 16 may move relative to the coil 12. In such cases, compared to the case in which the one of the first magnet conductor 11 and the magnet assembly 13 is connected to the coil 12 through the rigid connection, the coil 12 may be elastically connected to at least one of the first magnet conductor 11 and the magnet assembly 13 through the elastic member 16 such that in a relatively low-frequency range, the one of the first magnet conductor 11 and the magnet assembly 13 that is elastically connected to the coil 12 through the elastic member 16 may keep following the coil 12, which may be equivalent to increasing the total mass, and correspondingly the resonance peak may shift towards the relatively low-frequency range, thereby improving a low-frequency expressiveness of the transducer device 10 and generating a relative movement in the relatively high-frequency range. In such cases, the sensitivity of the transducer device 10 may be improved.

Figure 10:
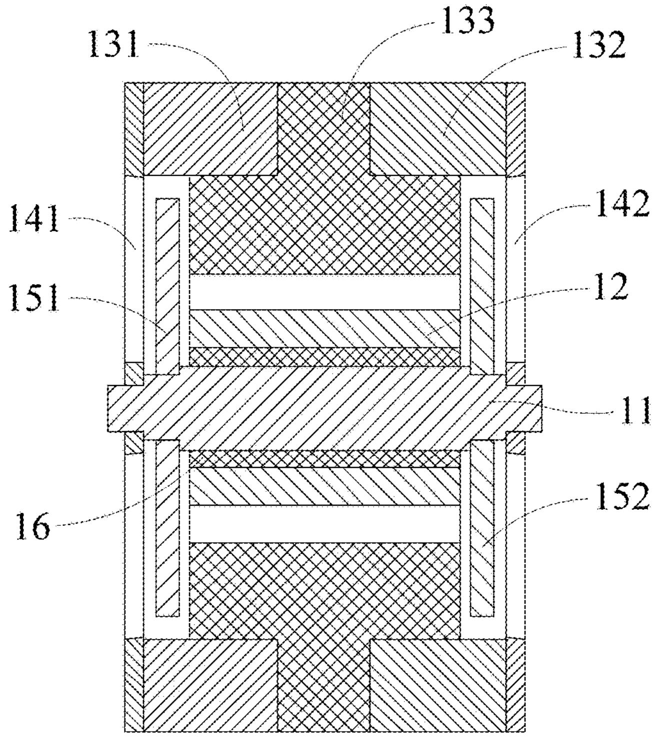
FIG. 10 is a schematic diagram illustrating a cross-sectional structure of a transducer device according to an embodiment of the present disclosure.

For example, according to FIG. 10, the coil 12 may be elastically connected to one of the first magnet conductor 11 and the magnet assembly 13 through the elastic member 16. The coil 12 may be spaced apart from the other one of the first magnet conductor 11 and the magnet assembly 13 in the second reference direction. For ease of description, an embodiment in which the coil 12 is elastically connected to the first magnet conductor 11 through the elastic member 16, and the coil 12 is spaced apart from the magnet assembly 13 in the second reference direction is provided below as an example. The first magnet conductor 11 may serve as the outputted of the transducer device 10. In such cases, in the first target frequency range from 50 Hz to 200 Hz, as the coil 12 moves with the first magnet conductor 11 through the elastic member 16, which is equivalent to increasing the total mass of the output end of the transducer device 10 such that the resonance peak of the output end of the transducer device 10 may be shifted towards the relatively low-frequency range, thereby improving the low-frequency expressiveness of the transducer device 10. Moreover, in the second target frequency range from 2 kHz to 20 kHz, as the first magnet conductor 11 moves relative to the coil 12, the coil 12 may not move with the first magnet conductor 11, which is equivalent to reducing the total mass of the output end of the transducer device 10, thereby increasing the sensitivity of the transducer device 10. In addition, as the coil 12 does not move with the first magnet conductor 11 in the relatively high-frequency range (e.g., the second target frequency range), the displacement of the coil 12 may be reduced, which reduces the risk of the wire of the coil 12 being ripped off, thereby improving the reliability of the coil 12.

It should be noted that different from FIG. 10, the coil 12 may also be elastically connected to the magnet assembly 13 through the elastic member 16, and the coil 12 may be spaced apart from the first magnet conductor 11 in the second reference direction. In such cases, the first magnet conductor 11 may serve as the output end of the transducer device 10, and the same or similar technical effect may also be realized, which is not repeated here. Furthermore, the specific structure of the members such as the magnet assembly 13, the first vibration transmission plate 141, the second vibration transmission plate 142, the third magnet conductor 151, and the fourth magnet conductor 152, the connection relationships thereof, and the corresponding technical effects are described in detail above, which are not repeated herein. When the coil 12 is elastically connected to the magnet assembly 13 through the elastic member 16, the coil 12 may be fixed to an inner side of the second magnet conductor 133 (e.g., the cylindrical portion 1331) facing the first magnet conductor 11. At this time, in consideration of the need for space for the movement of the coil 12 relative to the magnet assembly 13, the second magnet conductor 133 may not include the first limiting portion 1333 and the second limiting portion 1334 that are connected to the cylindrical portion 1331.

According to the relevant descriptions above, the first magnet 131 and the second magnet 132 in the magnet assembly 13 may be configured to provide a stable magnetic field for the magnet assembly 13, i.e., the magnet assembly 13 may be disposed as a dual magnet structure. The magnet assembly 13 may also be disposed as a single magnet structure, i.e., only one of the first magnet 131 and the second magnet 132 may be disposed to provide the stable magnetic field for the magnet assembly 13. It should be noted that the first magnet 131 and the second magnet 132 may generate a relatively greater repulsive force in the assembling process, which may result in great difficulty in assembling the dual magnet structure. The repulsive force may not exist in the single magnet structure such that the assembling process may be less difficult and more convenient.

Figure 11:
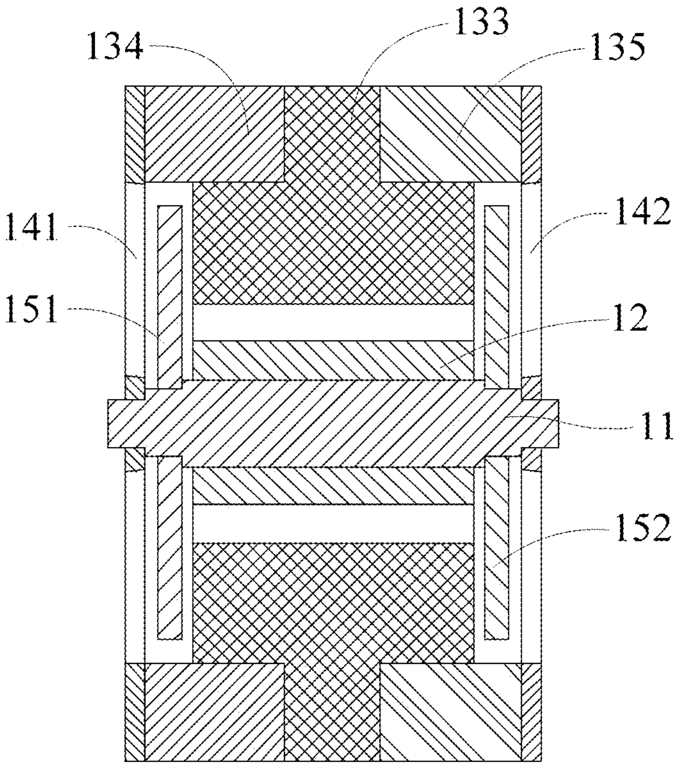
FIG. 11 is a schematic diagram illustrating a cross-sectional structure of a transducer device according to an embodiment of the present disclosure.

For example, according to FIG. 11, the magnet assembly 13 may include a third magnet 134 and an adapter 135 stacked along the first reference direction. The third magnet 134 may be made of the hard magnetic material, and the adapter 135 may not be made of the hard magnetic material to form the single magnet structure. The first vibration transmission plate 141 and the second vibration transmission plate 142 may be disposed on two sides of the coil 12 in the first reference direction. The first vibration transmission plate 141 may be connected to the third magnet 134 and one end of the first magnet conductor 11. The second vibration transmission plate 142 may connect the other end of the first magnet conductor 11 and the adapter 135.

It should be noted that in the present disclosure, the first magnet 131, the second magnet 132, and the third magnet 134 may be made of hard magnetic materials such as high carbon steel, alnico cobalt alloy, and titanium cobalt alloy. The first magnet conductor 11, the second magnet conductor 133, the third magnet conductor 151, and the fourth magnet conductor 152 may be made of soft magnetic materials such as silicone steel and iron-nickel alloy. Further, the adapter 135 not being made of a hard magnetic material refers to that the adapter 135 is made of a material other than the hard magnetic material. For example, the adapter 135 may be made of the soft magnetic material. As another example, the adapter 135 may be made of non-magnetic materials such as plastic and ceramic. When the adaptor 135 is made of the soft magnetic material, according to FIG. 11, the adaptor 135 may be integrally molded with the second magnet conductor 133. In some embodiments, according to FIG. 8, one of the third magnet conductor 151 and the fourth magnet conductor 152 that is connected to the adapter 135 may be integrally molded with the adapter 135 and the second magnet conductor 133.

Further, an orthographic projection of the coil 12 on an inner circumferential surface of the magnet assembly 13 along a second reference direction may overlap with a junction between the third magnet 134 and the adapter 135 such that more magnetic inductive lines of the magnetic field formed by the magnet assembly 13 may pass through the coil 12, thereby increasing the utilization of the magnetic field formed by the magnet assembly 13. A half-height of the coil 12 in the first reference direction may be flush with the junction between the third magnet 134 and the adapter 135.

Further, at least a portion of the second magnet conductor 133 may be disposed on an inner side of the third magnet 134 and the adapter 135 facing the first magnet conductor 11. The second magnet conductor 133 may be configured to adjust the magnetic inductive lines of the magnetic field provided by the third magnet 134 so that the aforementioned magnetic inductive lines may be as close as possible to the second reference direction. For example, the magnetic inductive lines may travel from or back to the magnet assembly 13 in a manner perpendicular to an inner ring of the second magnet conductor 133 facing the first magnet conductor 11. In such cases, the magnetic inductive lines may pass through the coil 12 along a radial direction of the coil 12 such that the transducer device 10 may generate a sufficiently strong mechanical vibration. Further, an orthographic projection of the coil 12 along the second reference direction and an orthographic projection of the third magnet 134 along the second reference direction may form a first overlap region. The orthographic projection of the coil 12 along the second reference direction and an orthographic projection of the second magnet conductor 133 along the second reference direction may form a second overlap region. A height of the second overlap region in the first reference direction may be greater than a height of the first overlap region in the first reference direction such that more of the magnetic inductive lines may pass through the coil 12 along the radial direction of the coil 12.

For example, the second magnet conductor 133 may include a cylindrical portion 1331 and an annular portion 1332 connected to an outer periphery of the cylindrical portion 1331. A thickness of the cylindrical portion 1331 in the first reference direction may be greater than a thickness of the annular portion 1332 in the first reference direction. The annular portion 1332 may be sandwiched between the third magnet 134 and the adapter 135. orthographic projections of the coil 12 and the cylindrical portion 1331 along the second reference direction may form the second overlap region. Further, the height of the coil 12 in the first reference direction may be less than or equal to the thickness of the cylindrical portion 1331 in the first reference direction. A thickness of the cylindrical portion 1331 in the first reference direction may be less than or equal to a sum of the thicknesses of the third magnet 134, the adapter 135, and the annular portion 1332 in the first reference direction. In such cases, the coil 12 may be fixed to the inner side of the cylindrical portion 1331 facing the first magnet conductor 11 through a rigid connection or an elastic connection, or the coil 12 may be fixed to the first magnet conductor 11 through a rigid connection or an elastic connection. The rigid connection or the elastic connections, as well as the corresponding technical effects, are described in detail above and are not repeated herein.

According to the above detailed descriptions, for the magnet assembly 13, the single magnet structure may be obtained by replacing the first magnet 131 and the second magnet 132 in the dual magnet structure with the third magnet 134 and the adapter 135, respectively. The specific structures of the other members such as the first magnet conductor 11, the coil 12, the first vibration transmission plate 141, the second vibration transmission plate 142, the third magnet conductor 151, the fourth magnet conductor 152, and the connection relationships thereof, may remain unchanged. In such cases, the transducer device 10 provided with the single magnet structure may have the same or similar technical effects as the transducer device 10 provided with the dual magnet structure, which are not repeated herein.

According to FIG. 12, an earphone 20 may include a support assembly 21 and a core module 22 connected to the support assembly 21. The support assembly 21 may be configured to support the core module 22 and place the core module 22 at a wearing position. The core module 22 may be configured to convert the excitation signal into mechanical vibration so that the user hears the sound through the earphone 20. For example, as shown in (a) of FIG. 12, the support assembly 21 may be disposed in a ring shape and disposed around the user's ear. As another example, as shown in (b) of FIG. 12, the support assembly 21 may include an ear hook and a rear hook to be hung on the user's ear and wound around a rear side of the head. As another example, as shown in (c) in FIG. 12, the support assembly 21 may be disposed as a headband structure and wound around the top of the user's head. Correspondingly, the wearing position may be the front side of the user's ear away from the head or the user's cheek near the ear. Furthermore, the core module 22 may include a core housing 23 connected to the support assembly 21 and the transducer device 10. The transducer device 10 may be disposed in the accommodation cavity of the core housing 23. More descriptions regarding the specific structure of the transducer device 10 and the corresponding technical effects are described in detail above, which are not repeated here. For ease of description, the transducer device 10 shown in FIG. 9 is described as an example.

It should be noted that there may be two core modules 22 in the present disclosure. Both of the core modules 22 may convert the excitation signals into core vibrations, which may facilitate the realization of the stereo sound effects of the earphone 20. In some other application scenarios where a stereo sound requirement is not particularly high, such as hearing aids for hearing patients, live teleprompter for hosts, etc., the earphone 20 may also be provided with only one core module 22.

In some embodiments, the core housing 23 may include an inner cylinder wall 231, and a first end wall 232 and a second end wall 233 connected to two ends of the inner cylinder wall 231. In the first reference direction, the first end wall 232 and the second end wall 233 may be disposed on opposing sides of the transducer device 10, respectively, and may enclose an accommodation cavity of the core housing 23 with the inner cylinder wall 231. The inner cylinder wall 231, the first end wall 232, and the second end wall 233 may be structural members independent from each other. One of the first end wall 232 and the second end wall 233 may also be integrally molded with the inner cylinder wall 231, which may facilitate the assembly of the transducer device 10 or other members into the accommodation cavity of the core housing 23. Further, one of the first end wall 232 and the second end wall 233 may be configured to contact or abut against the skin of the user to transfer the mechanical vibrations generated by the transducer device 10 to the user. The abutting against refers to not being in direct contact with the user's skin.

For example, according to FIG. 13, the magnet assembly 13 may be connected to the inner cylinder wall 231, and the first magnet conductor 11 may be spaced apart from the first end wall 232 and the second end wall 233, respectively. The magnet assembly 13 may serve as the output end of the transducer device 10. In such cases, the mechanical vibration generated by the transducer device 10 may be further transmitted to the user through one of the first end wall 232 and the second end wall 233 that contacts or abuts against the user's skin such that the user may hear the sound through the earphone 20. It should be noted that the members such as a battery and a circuit board in the earphone 20 may be fixed relative to the core housing 23 such that when the coil 12 is fixed on the inner side of the magnet assembly 13 facing the first magnet conductor 11, the displacement of the coil 12 relative to the members such as the battery and the circuit board may not be too great. In such cases, the outgoing wires of the coil 12 (e.g., the outgoing wire for connecting the battery and the circuit board to receive the excitation signal) may be less susceptible to being ripped off.

For example, according to FIG. 14, the first magnet conductor 11 may be connected to at least one of the first end wall 232 and the second end wall 233, and the magnet assembly 13 may be spaced apart from the inner cylinder wall 231 in the second reference direction. The first magnet conductor 11 may serve as the output of the transducer device 10. One of the first end wall 232 and the second end wall 233 that contacts or abuts against the skin of the user may be connected to the first magnet conductor 11. The other one of the first end wall 232 and the second end wall 233 that does not contact or abut against the user's skin may be spaced apart from the first magnet conductor 11. For example, the first end wall 232 may be configured to contact or abut against the user's skin. One end of the first magnet conductor 11 may be connected to the first end wall 232, and the other end of the first magnet conductor 11 may be spaced apart from the second end wall 233. In such cases, the mechanical vibration generated by the transducer device 10 may be directly transmitted to the user through the first end wall 232, which may reduce a loss of the mechanical vibration in the transmission process such that the user may hear the sound more effectively through the earphone 20. For example, the intensity of the sound heard by the user may be increased. In addition, as the magnet assembly 13 is not connected to the inner cylinder wall 231 and the first magnet conductor 11 is not connected to the second end wall 233, the mechanical vibration generated by the transducer device 10 may be less transmitted to the second end wall 233, which may reduce a sound leakage of the earphone 20. Furthermore, the end of the first magnet conductor 11 that is not connected to the first end wall 232 or the second end wall 233 may be connected to the core housing 23 through a vibration damping sheet 24. For example, the second end wall 233 may press an edge region of the vibration damping sheet 24 on the inner cylinder wall 231, which may prevent the transducer device 10 from shaking and colliding during vibration, thereby increasing the reliability of the core module 22. The specific structure of the vibration damping sheet 24 may be the same as or similar to that of the first vibration transmission plate 141 (or the second vibration transmission plate 142), which is not repeated herein. Since the vibration damping sheet 24 and the first vibration transmission plate 142 are connected to different members and play different roles, there may be a certain difference between rigidities of the vibration damping sheet 24 and the first vibration transmission plate 142, and those skilled in the art may carry out a reasonable design according to the actual needs, which is not repeated here.

In some embodiments, the core module 22 may include the vibration damping sheet 24 and a vibration panel 25. The transducer device 10 may be suspended within the accommodation cavity of the core housing 23 through the vibration damping sheet 24. The vibration panel 25 may be connected to the first magnet conductor 11 and may be configured to contact or abut against the skin of the user to transmit the mechanical vibration generated by the transducer device 10 to the user. The first magnet conductor 11 may serve as the output end of the transducer device 10. In the related techniques, the vibration panel 25 is connected to the coil 12 through a bracket (generally a plastic component) and the bracket may be subject to a complex high-order mode in relatively high frequency ranges, which may result in a poor high-frequency performance of the earphone 20. In this embodiment, the vibration panel 25 is connected to the first magnet conductor 11, an elastic modulus of the first magnet conductor 11 is much greater than the modulus of the bracket, and the first magnet conductor 11 is disposed in a columnar shape such as a cylindrical structure. In such cases, the first magnet conductor 11 is almost free of complex high-order mode in the relatively high-frequency range, which may improve the high-frequency performance of the earphone 20. In addition, in the related techniques, the vibration panel 25 is connected to the bracket in a plug-in manner. For example, the bracket may be provided with a plug-in post for inserting into the vibration panel 25. The plug-in post may break due to insufficient structural strength between the plug-in post and the bracket, which disconnects the vibration panel 25 and the bracket. The vibration panel 25 in this embodiment may be connected to the first magnet conductor 11 without the need for the bracket and the plug-in post, and the structural strength of the first magnet conductor 11 may be much greater than the structural strength of the bracket. In such cases, the connection between the vibration panel 25 and the first magnet conductor 11 may be more reliable, which may increase the reliability of the core module 22.

Further, there may be two vibration damping sheets 24, and the two vibration damping sheets 24 may be disposed on two sides of the coil 12 in the first reference direction. Center regions of the two vibration damping sheets 24 may be connected to two ends of the first magnet conductor 11 in the first reference direction, respectively. Edge regions of the two vibration damping sheets 24 may be connected to the core housing 23, respectively. In such cases, the transducer device 10 may be suspended in the accommodation cavity of the core housing 23 through two vibration damping sheets 24 spaced apart from each other, which may prevent the transducer device 10 from shaking and colliding during vibration.

Further, the core module 22 may include a connection member 26 connecting the vibration panel 25 and the first magnet conductor 11. The connection member 26 may be integrally molded with the vibration panel 25. In such cases, the connection member 26 may be nested in the first magnet conductor 11. In some embodiments, a portion of the first magnet conductor 11 may be inserted into the connection member 26.

For example, according to FIG. 15, an end of the core housing 23 close to the vibration panel 25 may have an open structure. For example, the core housing 23 may not include the first end wall 232. In such cases, the transducer device 10 or other members may be assembled within the accommodation cavity of the core housing 23. After assembly, the open end of the core housing 23 may be covered with a face cover such as silicone and a mesh face cover, which may improve the waterproof and dustproof performances of the core module 22, prevent the transducer device 10 from falling out of the core housing 23 in the case of dropping, etc., and increase the appearance of the core module 22 to prevent the user from seeing an internal structure of the core module 22. In such cases, the vibration panel 25 may abut against the user's skin, and the face cover may be in contact with the user's skin.

For example, according to FIG. 16, the core housing 23 may include an inner cylinder wall 231, and a first end wall 232 and a second end wall 233 connected to the two ends of the inner cylinder wall 231, respectively. In the first reference direction, the first end wall 232 and the second end wall 233 may be disposed on opposite sides of the transducer device 10, respectively, and may enclose the accommodation cavity of the core housing 23 with the inner cylinder wall 231. The vibration panel 25 may be disposed outside the core housing 23, one end of the connection member 26 may be connected to the vibration panel 25 and the other end of the connection member 26 may extend into the core housing 23 through a mounting hole on the first end wall 232 and be connected to the first magnet conductor 11. In other words, compared to the core housing 23 with one end having the open structure illustrated in FIG. 15, the core housing 23 shown in FIG. 16 may not have the open structure. That is, other portions of the first end wall 232 other than the mounting hole, may have closed structures. In such cases, even though a portion of the mechanical vibration generated by the transducer device 10 is transmitted to the core housing 23 through the vibration damping sheet 24, phases of the sound leakages generated by the first end wall 232 and the second end wall 233 vibrating with the transducer device 10 may be opposite, and the sound leakages may cancel each other in the far field. That is, the core housing 23 itself may reduce the sound leakage of the earphone 20 based on the principle of acoustic dipoles. Therefore, fewer or even no sound leakage reduction holes may be disposed on the core housing 23, which may improve the waterproof and dustproof performance of the earphone 20.

Furthermore, when viewed along the first reference direction, an area of the vibration panel 25 may be greater than an area of the mounting hole, and the area of the mounting hole may be greater than an area of the connection member

26. In such cases, the mechanical vibration generated by the transducer device 10 may not be transmitted to the core housing 23 through the connection member 26, which may further reduce the sound leakage of the earphone 20.

In some embodiments, the accommodation cavity of the core housing 23 may be in flow communication with the exterior of the earphone 20 only through a first channel. The first channel may be a gap between the connection member 26 and a wall of the mounting hole. In other words, the core housing 23 may not include a sound reduction hole. The earphone 20 may reduce the sound leakage based on the cancellation between the sound leakage generated by the first end wall 232 and the sound leakage generated by the second end wall 233 in the far field.

In some embodiments, the accommodation cavity of the core housing 23 may be in flow communication with the exterior of the earphone 20 only through the first channel and a second channel. The first channel may be a gap between the connection member 26 and a wall of the mounting hole. A ratio between an open area of the second channel and an open area of the first channel may be less than or equal to 10%. The second channel may be configured as a sound leakage reduction hole to further adjust or optimize the sound leakage of the earphone 20 based on the sound leakage reduction of the acoustic dipole. In such cases, the sound leakage of the earphone 20 may be reduced based on the acoustic dipole, so that the sound leakage of the earphone 20 may be at a level acceptable to the user. Compared to the sound leakage reduction manner performed only through the sound leakage reduction holes in the related techniques, the open area of the second channel may be much smaller, which may meet the waterproof and dustproof requirements of the earphone 20. In some embodiments, instead of being used as an acoustic hole such as the sound leakage reduction hole, the second channel may be used as an appearance hole. For example, in the embodiment where the earphone 20 includes two core modules 22, one of the core modules 22 may be provided with a microphone, and a microphone hole may be provided on the core housing 23. The other core module 22 may not be provided with the microphone, but the core housing 23 thereof may be disposed with the appearance hole corresponding to the microphone hole, or the core housing 23 may be simply disposed with a through hole serves no other purpose.

It should be noted that in some embodiments same as or similar to the embodiment illustrated in FIG. 13, the edge regions of the first vibration transmission plate 141 and the second vibration transmission plate 142 may be connected to the core housing 23. For example, the first end wall 232 may press the edge region of the first vibration transmission plate 141 on the inner cylinder wall 231. The second end wall 233 may press the edge region of the second vibration transmission plate 142 on the inner cylinder wall 231. In such cases, the first magnet conductor 11 and the members connected thereto (e.g., the coil 12, the third magnet conductor 151, and the fourth magnet conductor 152) may be suspended in the accommodation cavity of the core housing 23. Similarly, in some embodiments same as or similar to any one of the embodiments illustrated in FIG. 14-FIG. 16, the center regions of the first vibration transmission plate 141 and the second vibration transmission plate 142 may be connected to the magnet assembly 13. For example, the center regions of the first vibration transmission plate 141 and the second vibration transmission plate 142 may be respectively connected to two sides of the magnet assembly 13 in the first reference direction. The edge regions of the first vibration transmission plate 141 and the second vibration transmission plate 142 may be connected to the core housing 23. For example, the first end wall 232 may press the edge region of the first vibration transmission plate 141 on the inner cylinder wall 231, and the second end wall 233 may press the edge region of the second vibration transmission plate 142 on the inner cylinder wall 231. In such cases, the magnet assembly 13 and the members connected thereto (e.g., the coil 12, the third magnet conductor 151, and the fourth magnet conductor 152) may be suspended in the accommodation cavity of the core housing 23.

Further, the earphone 20 may include a mass block connected to the core housing 23. The mass block may include at least one of an air-conduction speaker, a battery, a circuit board, a function button, and a stick microphone that is configured to facilitate the earphone 20 to perform the corresponding function. The mass block may be selectively disposed at different positions according to actual needs. For example, the mass block may be disposed inside the core housing 23 or outside the core housing 23. No matter within the core housing 23 or outside of the core housing 23, the mass block may be fixed to one of the first end wall 232 and the second end wall 233 that does not contact or abut against the skin of the user, or may be fixed to the inner cylinder wall 231. It should be noted that when the mass block is the air-conduction speaker, the mass block may be fixed to the inner cylinder wall 231 such that the vibration direction of the air-conduction speaker is not parallel to the vibration direction of the transducer device 10. For example, the vibration direction of the air-conduction speaker and the vibration direction of the transducer device 10 may be orthogonal to each other.

The foregoing is only a portion of the embodiments of the present disclosure, which is not intended to limit the scope of protection of the present disclosure, and any equivalent device or equivalent process transformations utilizing the contents of the present disclosure and the accompanying drawings, or applying them directly or indirectly in other related fields of technology, may be similarly included in the scope of patent protection of the present disclosure.

What is claimed is:

1. A transducer device including a first magnet conductor, a coil, and a magnet assembly, wherein an orthographic projection of the coil on a reference plane perpendicular to a first reference direction surrounds a periphery of an orthographic projection of at least a portion of the first magnet conductor on the reference plane, an orthographic projection of the magnet assembly on the reference plane surrounds a periphery of the orthographic projection of the coil on the reference plane, at least one of the first magnet conductor and the magnet assembly is elastically connected to the coil through an elastic member, and a magnetic field generated by the coil after an excitation signal is input interacts with a magnetic field generated by the magnet assembly to cause the first magnet conductor to move relative to the magnet assembly, wherein the transducer device further includes a first vibration transmission plate and a second vibration transmission plate disposed on two sides of the coil in the first reference direction, respectively, the first vibration transmission plate is connected to one end of the first magnet conductor and one end of the magnet assembly, and the second vibration transmission plate is connected to the other end of the first magnet conductor and the other end of the magnet assembly.

2. The transducer device of claim 1, wherein the coil is elastically connected to one of the first magnet conductor and the magnet assembly through the elastic member, the coil is spaced apart from the other one of the first magnet conductor and the magnet assembly in a second reference direction perpendicular to the first reference direction, and in a target frequency range of 50 Hz to 200 Hz, the coil moves following the one of the first magnet conductor and the magnet assembly through the elastic member.

3. The transducer device of claim 2, wherein the elastic member is a dried glue, and the dried glue is silicone or hot melt glue.

4. The transducer device of claim 1, at least one of the first vibration transmission plate and the second vibration transmission plate is configured as the elastic member.

5. The transducer device of claim 1, wherein the magnet assembly includes a first magnet and a second magnet stacked along the first reference direction, a direction of a magnetic field of the first magnet is different from a direction of a magnetic field of the second magnet, an orthographic projection of the coil on an inner circumferential surface of the magnet assembly along a second reference direction overlaps with a junction between the first magnet and the second magnet, the second reference direction is perpendicular to the first reference direction, the first vibration transmission plate is connected to the first magnet, and the second vibration transmission plate is connected to the second magnet.

6. The transducer device of claim 5, wherein the direction of the magnetic field of the first magnet and the direction of the magnetic field of the second magnet are opposite to each other and are parallel to the first reference direction, and the magnet assembly includes a second magnet conductor, at least a portion of the second magnet conductor being disposed on an inner side of the first magnet and the second magnet facing the first magnet conductor, and the coil being disposed on an inner side of the second magnet conductor facing the first magnet conductor.

7. The transducer device of claim 1, wherein the magnet assembly includes a third magnet and an adapter stacked along the first reference direction, the third magnet is made of a hard magnetic material, the adapter is not made of the hard magnetic material, an orthographic projection of the coil on an inner circumferential surface of the magnet assembly along a second reference direction overlaps with a junction between the third magnet and the adapter, the second reference direction is perpendicular to the first reference direction, the first vibration transmission plate is connected to the third magnet and the second vibration transmission plate is connected to the adapter.

8. The transducer device of claim 7, wherein the magnet assembly includes a second magnet conductor, the second magnet conductor including a cylindrical portion and an annular portion connected to an outer periphery of the cylindrical portion, the annular portion being sandwiched between the third magnet and the adapter, the coil being disposed on an inner side of the cylindrical portion facing the first magnet conductor, and an orthographic projection of the coil along the second reference direction forms a first overlap region with an orthographic projection of the third magnet along the second reference direction, the orthographic projection of the coil along the second reference direction forms a second overlap region with an orthographic projection of the cylindrical portion along the second reference direction, a height of the second overlap region in the first reference direction is greater than a height of the first overlap region in the first reference direction.

9. The transducer device of claim 1, further including a third magnet conductor and a fourth magnet conductor respectively connected to two ends of the first magnet conductor.

10. The transducer device of claim 9, wherein the third magnet conductor is located on an inner side of the first vibration transmission plate facing the second vibration transmission plate, and the fourth magnet conductor is located on an inner side of the second vibration transmission plate facing the first vibration transmission plate.

11. The transducer device of claim 1, wherein when the transducer device is in a non-working state with no excitation signal input to the coil, an edge region of the first vibration transmission plate is not coplanar with a center region of the first vibration transmission plate, and an edge region of the second vibration transmission plate is not coplanar with a center region of the second vibration transmission plate.

12. The transducer device of claim 11, wherein a distance between the edge region of the first vibration transmission plate and the center region of the first vibration transmission plate in the first reference direction is greater than or equal to 0.4 mm, and a distance between the edge region of the second vibration transmission plate and the center region of the second vibration transmission plate in the first reference direction is greater than or equal to 0.4 mm.

13. The transducer device of claim 11, wherein a length of the first magnet conductor is greater than a thickness of the magnet assembly in the first reference direction such that the center region of the first vibration transmission plate is farther away from the magnet assembly than the edge region of the first vibration transmission plate, and the center region of the second vibration transmission plate is farther away from the magnet assembly than the edge region of the second vibration transmission plate.

14. The transducer device of claim 1, wherein the first vibration transmission plate includes a first radial portion, the first radial portion including a plurality of first spokes spirally extending outward from a center of the first vibration transmission plate, and the second vibration transmission plate includes a second radial portion, the second radial portion including a plurality of second spokes spirally extending outward from a center of the second vibration transmission plate, when viewed along the first reference direction, a first spoke and a second spoke corresponding to each other have opposite spiral directions, a position of the first spoke at the first vibration transmission plate is the same as a position of the second spoke at the second vibration transmission plate.

15. The transducer device of claim 1, wherein the first vibration transmission plate includes a first radial portion, the first radial portion including a plurality of first spokes spirally extending outward from a center of the first vibration transmission plate, the first radial portion including a first sub-region and a second sub-region nested within each other along a radial direction of the first vibration transmission plate, spiral directions of the plurality of first spokes in the first sub-region and the second sub-region being opposite, and the second vibration transmission plate includes a second radial portion, the second radial portion including a plurality of second spokes spirally extending outward from a center of the second vibration transmission plate, the second radial portion including a third sub-region and a fourth sub-region nested within each other along a radial direction of the second vibration transmission plate, spiral directions of the plurality of second spokes in the third sub-region and the fourth sub-region being opposite.

16. An earphone including a support assembly and a core module connected to the support assembly, the support assembly being configured to support the core module and place the core module at a wearing position, the core module including a core housing, a transducer device, at least one vibration damping sheet, and a vibration panel, the core housing being connected to the support assembly, the transducer device being disposed in an accommodation cavity of the core housing, and the transducer device including a first magnet conductor, a coil, and a magnet assembly, the transducer device being suspended in the accommodation cavity through the at least one vibration damping sheet, and the vibration panel being connected to the first magnet conductor and configured to transmit a mechanical vibration generated by the transducer device to a user, wherein an orthographic projection of the coil on a reference plane perpendicular to a first reference direction surrounds a periphery of an orthographic projection of at least a portion of the first magnet conductor on the reference plane, an orthographic projection of the magnet assembly on the reference plane surrounds a periphery of the orthographic projection of the coil on the reference plane, at least one of the first magnet conductor and the magnet assembly is elastically connected to the coil through an elastic member, and a magnetic field generated by the coil after an excitation signal is input interacts with a magnetic field generated by the magnet assembly to cause the first magnet conductor to move relative to the magnet assembly.

17. The earphone of claim 16, wherein the core module includes a connection member, the core housing includes an inner cylinder wall, and a first end wall and a second end wall respectively connected to two ends of the inner cylinder wall, the first end wall and the second end wall are disposed on two opposite sides of the transducer device in the first reference direction and enclose the accommodation cavity with the inner cylinder wall, the first end wall is provided with a mounting hole, the vibration panel is located outside the core housing, one end of the connection member being connected to the vibration panel, and the other end of the connection member extending into the core housing through the mounting hole and being connected to the first magnet conductor, when viewed along the first reference direction, an area of the vibration panel is greater than an area of the mounting hole, and the area of the mounting hole is greater than an area of the connection member.

18. The earphone of claim 16, wherein the earphone includes a mass block connected to the core housing, the mass block including at least one of an air-conduction speaker, a battery, a circuit board, a function button, and a stick microphone.

* * * * *